United States Patent [19]
Sorber

[11] Patent Number: 6,018,515
[45] Date of Patent: Jan. 25, 2000

[54] MESSAGE BUFFERING FOR PRIORITIZED MESSAGE TRANSMISSION AND CONGESTION MANAGEMENT

[75] Inventor: Gordon P. Sorber, Kil, Sweden

[73] Assignee: Ericsson Messaging Systems Inc., Woodbury, N.Y.

[21] Appl. No.: 08/914,260

[22] Filed: Aug. 19, 1997

[51] Int. Cl.[7] .................................................. G01R 31/08
[52] U.S. Cl. ........................................... 370/229; 370/412
[58] Field of Search .................................... 370/230, 232, 370/235, 237, 381, 385, 412, 229

[56] References Cited

U.S. PATENT DOCUMENTS

| | | |
|---|---|---|
| 4,774,706 | 9/1988 | Adams . |
| 4,916,693 | 4/1990 | Shimada et al. . |
| 5,042,029 | 8/1991 | Hayakawa . |
| 5,193,151 | 3/1993 | Jain . |
| 5,268,895 | 12/1993 | Topper ................................... 370/58.3 |
| 5,282,203 | 1/1994 | Oouchi . |
| 5,299,194 | 3/1994 | Ichii et al. . |
| 5,353,326 | 10/1994 | Jung ............................................. 379/6 |
| 5,367,523 | 11/1994 | Chang et al. . |
| 5,367,643 | 11/1994 | Chang et al. . |
| 5,371,731 | 12/1994 | Pratt et al. . |
| 5,426,424 | 6/1995 | Vanden Heuvel et al. . |
| 5,473,604 | 12/1995 | Lorenz et al. . |
| 5,473,677 | 12/1995 | D'Amato et al. ........................ 379/112 |
| 5,475,732 | 12/1995 | Pester, III ................................. 379/34 |
| 5,487,061 | 1/1996 | Bray .......................................... 370/13 |
| 5,493,566 | 2/1996 | Ljungberg et al. . |
| 5,506,839 | 4/1996 | Hatta ......................................... 370/60 |
| 5,521,916 | 5/1996 | Choudhury et al. .................... 370/60.1 |
| 5,541,987 | 7/1996 | Topper et al. ........................... 379/230 |
| 5,559,999 | 9/1996 | Maturi . |
| 5,570,362 | 10/1996 | Nishimura . |
| 5,581,545 | 12/1996 | Moritomo ................................ 370/237 |
| 5,600,798 | 2/1997 | Cherukuri et al. . |
| 5,638,360 | 6/1997 | Sugawara . |
| 5,699,519 | 12/1997 | Shiobara . |
| 5,774,453 | 6/1998 | Fukano . |
| 5,781,532 | 7/1998 | Watt . |

FOREIGN PATENT DOCUMENTS

7160593  6/1995  Japan .

*Primary Examiner*—Chi H. Pham
*Assistant Examiner*—Kim T. Nguyen
*Attorney, Agent, or Firm*—Nixon & Vanderhye P.C.

[57] ABSTRACT

Message congestion and prioritization are effectively managed using a flexible approach that is easily implemented and configurable for different communications applications. A plurality of buffers are provided at a communications point with different buffers corresponding to different message priorities. The buffers may be, for example, first-in-first-out (FIFO) buffers. Messages to be transmitted from the communications point are processed to determine the priority of each message. Each message is stored in one of the plurality of buffers corresponding to its determined priority. Messages are transmitted starting from the highest priority buffer, continuing to the next priority buffer, and so forth. Each buffer includes a configurable size, congestion level, full level, and recovery level which are used to effectively manage transmission of messages in congested situations and to ensure that priority messages receive priority transmission.

17 Claims, 7 Drawing Sheets

MESSAGE BUFFERING FOR PRIORITIZED MESSAGE TRANSMISSION AND CONGESTION MANAGEMENT

FIELD OF THE INVENTION

The present invention relates generally to message handling, and more specifically, to prioritizing transmission of messages. The present invention finds particularly advantageous application to managing congested situations in data communications systems.

BACKGROUND AND SUMMARY OF THE INVENTION

In signaling networks in which messages are transmitted over a communications link between two signaling points, an enormous number of message units must be formatted and transmitted over an appropriate communications path. In an ideal environment, all message units would be transferred immediately to the appropriate destination without error or other impediment. However, in real world data communications, limited communication resources restrict both how much data can be transmitted and the speed of data message unit transmission. Moreover, there are a number of factors that detrimentally impact the accuracy with which messages are communicated. Consequently, message units or entire messages may need to be retransmitted.

One result of these message transmission impediments is that some type of congestion may often occur at one or more points in the message transmission process. Another message transmission problem is the issue of message priority, i.e., how to ensure that higher priority messages are transmitted before lower priority messages. Message priority is particularly important when there is congestion causing transmission delays.

One approach is to simply disregard message priorities in congested situations. Another approach is to discard messages when there is congestion. But neither of these approaches is desirable from the standpoint of accomplishing message priority transmission with a high degree of probability.

Network congestion and signal priority are factors generally raised in various standards, e.g., ANSI, TTC and ITU-T. In the ITU-T recommendation Q.704, section 3.8 sets forth criteria for determining signaling link and route congestion status. Different specific approaches for implementing some sort of message priority or message congestion scheme have also been proposed. For example, U.S. Pat. No. 5,268,895 to Topper generates and updates a composite, status memory to keep track of message congestion levels at signaling nodes in a communications network. U.S. Pat. No. 5,506,839 to Hatta discloses congestion control in a frame relay communications context. U.S. Pat. No. 5,521,916 to Choudhury et al. teaches storing packets in memory space priority subqueues in a shared memory asynchronous transfer mode (ATM) switch.

But while such congestion and priority schemes exist, they are often complicated, e.g., elaborate procedures to handle out of sequence or priority messages as in the latter mentioned patent. The Choudhury scheme, for example, employs a linked list of pointers to messages that is time inefficient, prone to error, and difficult to maintain and update. Moreover, Choudhury's method uses "space priorities" which relate to memory allocation rather than to message transmission priority. Such space priorities are maintained as subqueues in a total queue which is relatively complicated. Therefore, there is still a need for more effective and simplified management of message congestion that also implements message priority.

The ITU-T Recommendation Q.704 Signaling Network Functions and Messages section 3.8 Signaling Network Congestion contains a description of how a single or multi-level congestion buffer might be implemented using one buffer with single or multi-level congestion indications and priorities which is complicated and inefficient. In contrast, the inventive approach described below permits explicit assignment of transmission priorities by higher levels while essentially providing multi-level congestion indications with improved reliability, simplicity, and fewer discarded messages. Message recovery during changeover or changeback is also more easily and reliably performed while preserving message priority sequence.

It is an object therefore of the present invention to provide a simple technique for promptly and reliably reporting congestion of messages having a specific priority level as well as prioritizing transmission of messages based upon priorities established for each message to be transmitted.

It is a further object of the invention to provide a flexible and relatively simple approach for handling various levels of congestion and different priority messages that is also readily configurable for different communications applications.

These and other objectives are met and the above-identified problems are solved by the present invention. Communication messages are managed using a plurality of buffers, with different buffers corresponding to different message priorities. In one example embodiment, the buffers are first-in-first-out (FIFO) buffers. Messages to be transmitted are processed to determine the priority of each message. Each message is stored in one of the plurality of buffers corresponding to its determined priority. Messages are then transmitted starting from the highest priority buffer, continuing with the next higher priority buffer, and so forth. This approach is useful even when there is no congestion to give precedence to higher priority information over one or more other types of information.

A significant advantage of the present invention is that each of the buffers is configurable both in terms of its size and its individual parameters. For each buffer, a configurable congestion level, full level, and recovery level are established. When an accumulated number of messages in a buffer exceeds its established congestion level, a congestion message is generated requesting that one or more message sources temporarily stop sending messages for transmission. A configurable "overflow" region is maintained between the buffer's congestion level and full level in order to store any messages already "in the pipeline," i.e., messages requested to be transmitted before the congestion message was generated. However, once the number of messages in one of the buffers exceeds its full level, further received messages are not stored.

These levels may be selected to suit the delays between reporting congestion and reception of this report at the process which originates the congestion message and the time needed to react to this congestion report, which together determine the lag between occurrence of congestion and receipt of the last message sent by the originating process. There may be several messages in progress, i.e., "in the pipeline," which cannot be stopped. If these messages cannot be accommodated in the proper priority buffer, they are discarded. After the buffer level reaches or dips below its recovery level, a resume message is generated indicating that new messages having the corresponding priority at the one buffer will now be accepted. Such configurability permits buffer size and various limit levels to be optimally tuned to the specific requirements of a particular application. In one example application of the invention, a single congestion level is defined for each priority buffer. The buffer size is defined as twice this congestion level. This example buffer configuration is both efficient and simple. The recovery level is defined as half this congestion level. This example configuration is both efficient and simple.

For both international signaling standards and the ANSI recommendation for national networks, congestion signals are repeated for each received message with the same priority, n times, where n=8 (at this time). This repetition is achieved by use of a counter n for each priority buffer which is incremented for each message inserted after the buffer is filled to the specified congestion level, and the generation of a congestion report, which occurs while n<9. The counter n is reset to zero when the concerned buffer content is reduced to below the recovery level.

In an example, preferred embodiment, the present invention is applied to a data communications system where messages are transmitted from a first data communications signaling point to a second data signaling point in accordance with a multi-level signaling protocol such as Signaling System Number 7 (SS7), but which may be used in other protocols with even greater advantage, such as, (but not confined to), ATM and TCP/IP protocols. Moreover, while the present invention may be applied to any one of the layers/levels from the lowest to the highest in SS7, in the example embodiment, the invention is implemented in message transfer part-layer 2 (MTP-L2) and the interface module/bus handler between some implementations of MTP-L2 and the modules above it. Priorities for each message are determined by higher SS7 levels, and analyzed/processed by an MTP-L2 message controller which reports congestion and message transmission priorities using the configurable message priority buffering scheme described above.

These features and advantages as well as others of the present invention will be described in further detail in conjunction with the drawings below.

DETAILED DESCRIPTION OF THE INVENTION

In the following description, for purposes of explanation and not limitation, specific details are set forth such as specific signaling systems, hardware configurations, data structures, data flows, interfaces, techniques, etc. in order to provide a thorough understanding of the present invention. However, it will be apparent to one skilled in the art that the present invention may be practiced in other embodiments that depart from these specific details. For example, while the detailed example embodiment is disclosed in the context of Signaling System Number 7, the present invention may be used in many other communication and computer applications. For example, the present invention may be advantageously applied in TCP/IP-Internet applications, asynchronous transfer mode (ATM) signaling, mobile ISDN and other digital telephony and satellite communications, etc. In other instances, detailed descriptions of well-known methods, protocols, and data processing devices are omitted so as not to obscure the description of the present invention with unnecessary detail.

Figure 1:
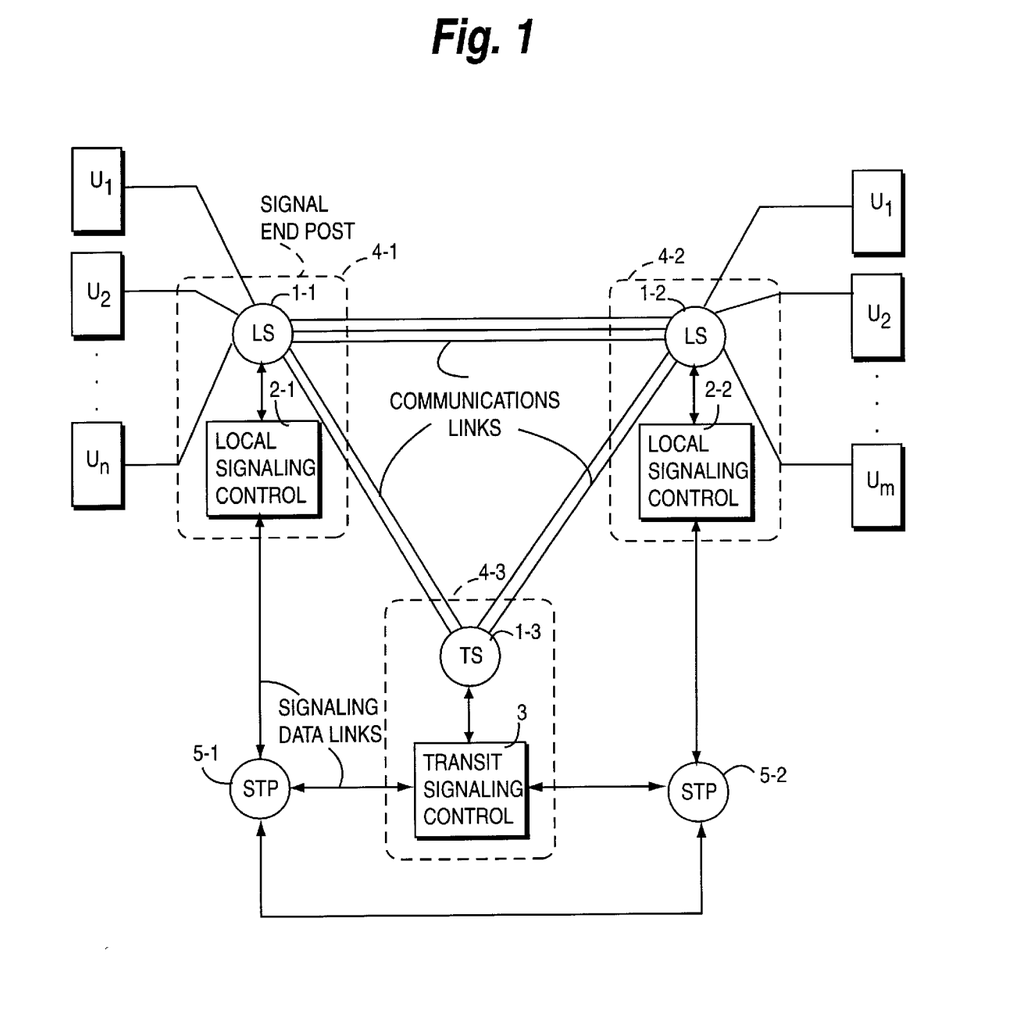
FIG. 1 is block diagram of a communications network including a signaling network in which the present invention may be employed.

FIG. 1 shows a communication network example in which the present invention may be advantageously applied. For simplicity, the network comprises local switches (LSs) 1-1 and 1-2 for serving user terminals $U_i$ and a transit switch (TS) 1-3. Switches 1-1, 1-2, and 1-3 may be circuit-switched or packet-switched systems interconnected by communication links to form, for example, an information network for carrying voice, data, video, facsimile, and control signals. Each of the switches is associated with a signaling controller with local signaling controllers 2-1 and 2-2 and transit signaling controller 3 associated with switches 1-1, 1-2, and 1-3, respectively, to form signal end points 4-1, 4-2, and 4-3. The signaling controllers may be interconnected by signaling data links via signal transfer points (STPs) 5-1 and 5-2 to form a signaling network in order for signaling messages to be transmitted from an originating signal end point to a destination signal end point according to CCITT (now ITU-T) recommendations. Specific reference is made to ITU-T Q-series recommendations, e.g., Q.701 to Q.706, inclusive and Q.710, which generally describe Layers 1 and 2 (and Layer 3) of the Message Transfer Part. However, this buffering scheme is applicable to other SS7 stack bases, e.g., with SCCP or LAPD, LAPF, etc.

Figure 2:
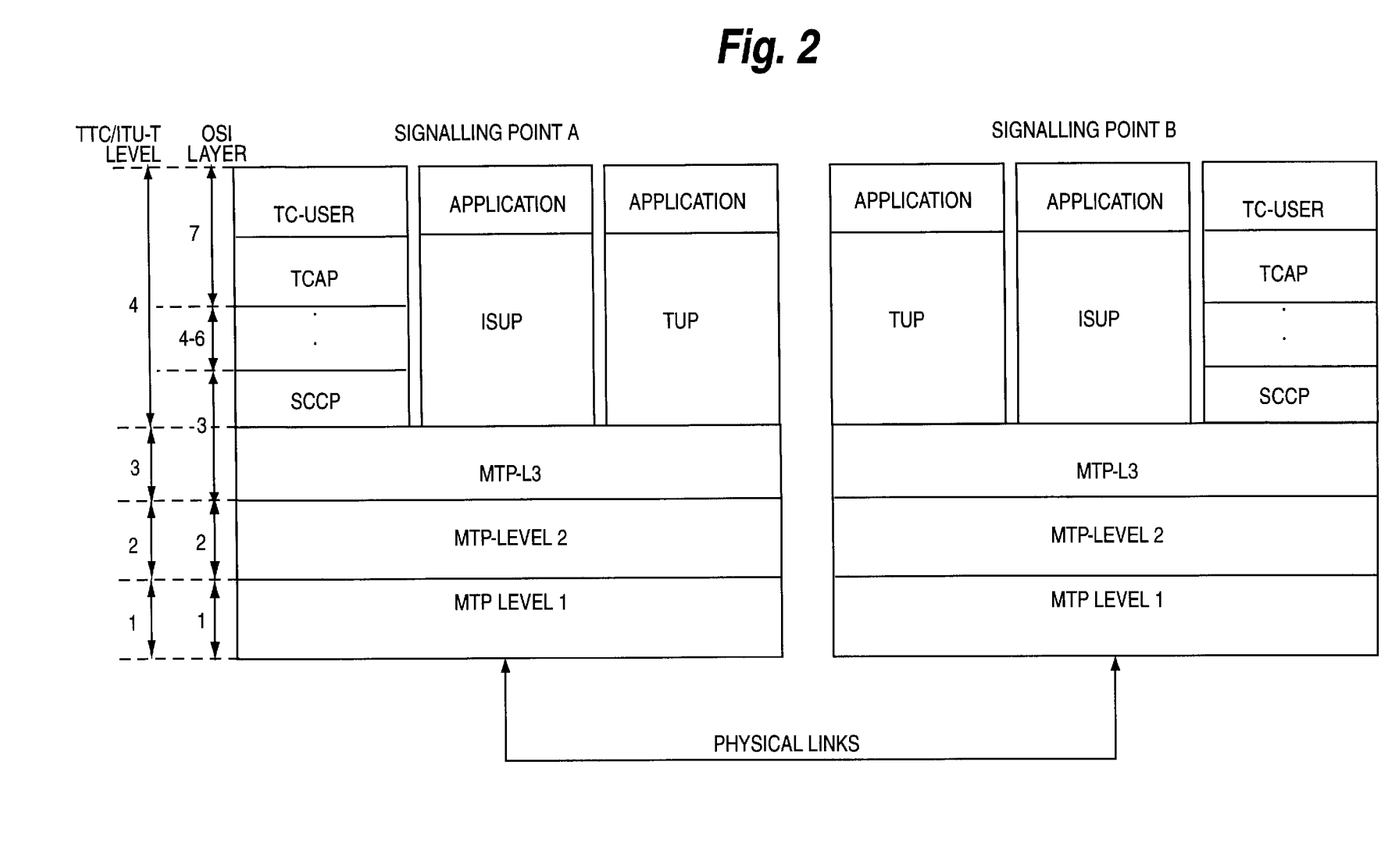
FIG. 2 is a diagram illustrating various levels or layers of different communication protocols models.

FIG. 2 shows a model of the Signaling System Number 7 functional levels sometimes referred to as ANSI/TTC levels alongside of the traditional OSI, seven-layer protocol model. In general, OSI layers 1–3 comprise functions for the transportation of information from one location to another possibly by way of a number of communication links in tandem. The message transfer part (MTP) and the signaling connection control part (SCCP) of Signaling System Number 7 are an example of SS7 modules which perform the OSI layer services 1–3.

OSI layers 4–7 define functions relating to end-to-end communication. These layers are independent of the internal structure of the communications network. Transaction capabilities (TC) and/or User Parts (UP) provide OSI layer 4–7 services. OSI layer 7 represents the semantics of a communication, and OSI layers 1–6 are the means by which the communication is realized. Application entities provide application layer protocols in OSI layer number 7.

Figure 7:
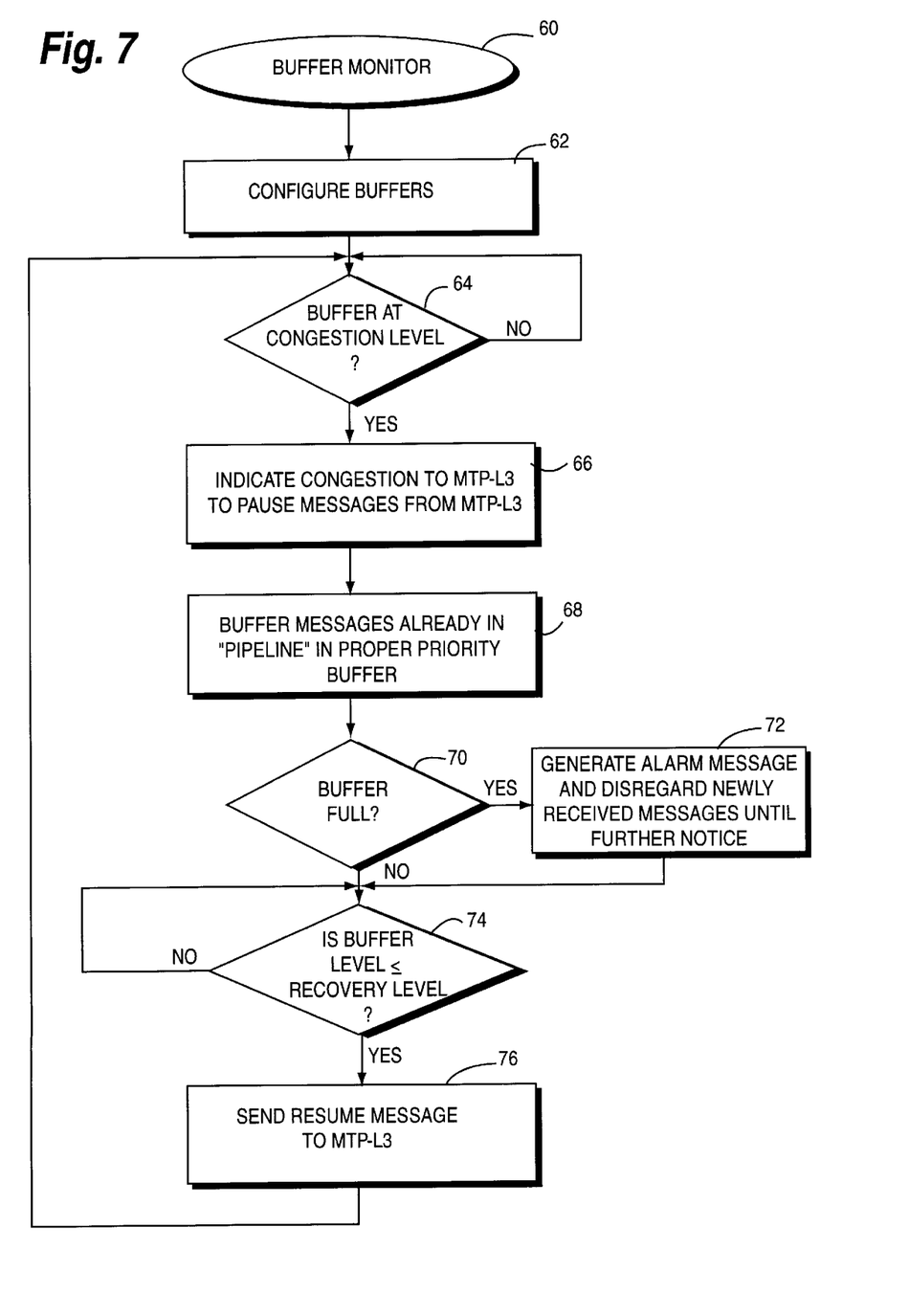
FIG. 7 is a flowchart diagram of a buffer monitor routine in accordance with an example embodiment of the present invention.

Since Signaling System Number 7 is used to transmit information between different users, for example telephony users or integrated services digital network (ISDN) users, its functions are divided into a number of "user" parts (UP) as shown in FIG. 7. TCAP stands for transaction capabilities application part, ISUP for ISDN user part, and TUP for telephony user part, among many others. The user parts process signal information before and after transmission to the signaling network. The message transfer part (MTP)

reliably transports and delivers user part information across the Signaling System Number 7 network. The MTP also reacts to system and network failures that affect the information from the user parts and takes the necessary action to ensure that the information is safely conveyed.

As shown in FIG. 2, the MTP is divided into three functional levels L1, L2, and L3. The MPT-L1 defines the physical, electrical, and functional characteristics of a signaling data link and the means to access it. The signaling link is sometimes referred to as a "bearer" and is a bi-directional transmission path for signaling messages between two signaling points, which traditionally consisted of copper wires but which are increasingly made up of glass-fiber, microwave, or satellite links. The common denominator is the transfer of information in the form of binary codes, i.e., as a sequence of states indicating zeros and ones. The MTP-L2 defines the functions and procedures for and relating to the transfer of signaling messages over one individual signaling link, including various ancillary functions, such as error detection, framing, bit-stuffing, etc. The MTP-L3 handles signaling network functions including message routing, discrimination, and distribution as well as signaling network management functions.

In general, a signaling message is transferred over the signaling link in the form of signal units. In the basic SS7 model, there are three types of signaling units differentiated by means of a length indicator. For information generated by a user part, a message signal unit (MSU) is used. The MSU carries the signal information between user parts, as the MSU is passed from SS7 module to module, down through the MTP layers to the link and to the next node, where it follows the same path up through the MTP layers and is finally delivered to the opposite user part. If an error is detected in the MSU at the receiving MTP-L2, reception is not acknowledged, and the MSU will be retransmitted. For control information to be exchanged by MTP-L2, link status signal units (LSSU) and fill in signal units (FISU) are used. The LSSU is used for starting up a signaling link and when there are errors in the link. The FISU is used to keep the link running when there are no MSUs to be sent. All three of these signals will contain parameters used to acknowledge (ACK) or reject (NACK) MSU signals at the transmitting MTP-L2 when a received MSU is found to be correct or in error when examined at the opposite MTP-L2.

Each local signaling controller includes data processing hardware and software for generating and formatting messages down the protocol stack for transmission on a link and up the protocol stack for delivery to an end application. For example, the local signaling controller hardware may include a SUN workstation that employs multiple processors connected via appropriate buses to random access memory (RAM), read-only memory (ROM), and magnetic storage media. The RAM main memory is used for storing temporary variables or other intermediate information during execution of instructions by the processors. ROM and/or other static storage devices store static information and instructions for the processor. The magnetic storage media may also store information instruction as well as various files.

Figure 3:
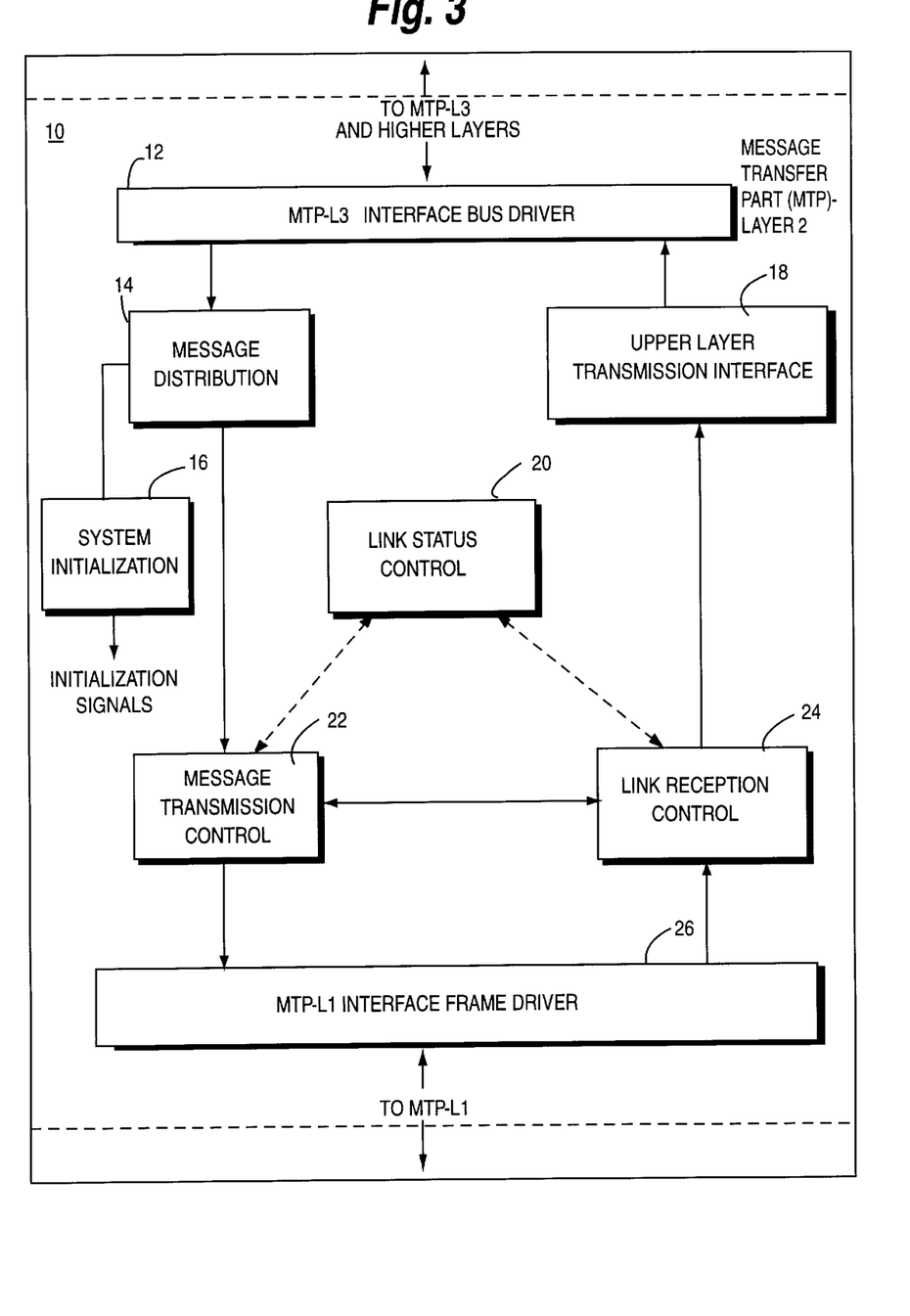
FIG. 3 is a function block diagram illustrating various processes implemented at MTP-L2 in accordance with an example embodiment of the present invention.

FIG. 3 shows a portion of the software functions implemented at each local signaling controller, and in particular, MTP-L2 software processes. Software process 12 is an MTP-3 interface bus driver that interfaces MTP-L2 and MTP-L3 communications. The MTP-L3 interface bus driver handles the transfer of all signals from MTP-L3 to message distribution process 14 and from the upper layer transmission interface process 18 to MTP-L3. Similarly, software process 26 is an MTP-L1 interface frame driver 26 that interfaces communications between MTP layers 2 and 1, while using large scale integration (LSI) circuit chips to perform framing, cyclic redundancy check (CRC) error tests, bit-stuffing functions, or other necessary link-related functions which are not relevant to understanding this invention. The MTP-L1 interface frame driver 26 transparently handles the transfer of all signals from the message transmission controller 22 to the communications link hardware and from the communications link hardware to the link reception control process 24.

The message distribution process 14 handles all signals received from MTP-L3 via the MTP-L3 interface bus driver 12 and distributes received signals to destination processes in MTP-L2. At system start up, a system initialization process 16 generates initialization signals to configure and start the various MTP-L2 software processes. The upper layer transmission interface software process 18 handles transmission of all signals to the MTP-L3 bus driver interface and higher layers. In systems where the MTP-L2 functions are integrated with the higher levels, so that there is no bus, process 12 may be omitted.

The link reception control software process 24 controls reception of all signal units from the communications link via the interface frame driver software process interface to MTP-L1 26. Incoming message units are processed sequentially without priority sorting. The sequential handling of incoming messages assumes that the priority of delivery of those incoming message units was established by the sending signaling node and standard recommendations stipulate message units from the communications link's reception control process 24 are forwarded in sequence as received to the upper layer transmission layer interface 18 for delivery up the protocol stack. A link status control software process 20 monitors the status of the signaling link between node 10 and other nodes and performs a variety of functions, e.g., initial alignment control (IAC).

The message transmission control software process 22 controls the transmission of message units on the signaling link. Message transmission control software process 22 includes one or more priority transmit buffers (TB). Each priority transmit buffer corresponds to one priority level. Message transmission control 22 also includes a "retransmit"buffer (RTB).

There are three types of messages which are sent over the link via the message transmission control process 22 and the MTP-L1 interface frame driver 26: link status signal units (LSSUs), message signal units (MSUs), and fill-in signal units (FISUs) as described above. In the example embodiment, the present invention is advantageously applied to buffering and prioritizing MSUs received from message routing and distribution software process 14 for transmission over the physical communications link.

When MSUs are sent over a link, they may be corrupted by some problem on the link including electrical noise, magnetic fields, broken circuits, etc. Consequently, each message is acknowledged (ACK) as correct or not acknowledged (NACK). Messages that are not acknowledged are retransmitted. The transmitting node has no way of knowing whether the link is functioning or not, except by the rate of receipt of ACKs or NACKs, by expiration of timers when an expected response is not received or by a large number of errors in received signals. Moreover, the transmitting node cannot wait for an acknowledgment before sending the next MSU.

In view of these circumstances, the transmission control process 22 employs the retransmit buffer to store a copy of each transmitted message until an acknowledgment for that specific message is received. When a message is acknowledged, it is deleted from the retransmit buffer, together with any preceding messages in the re-transmit buffer. On the other hand, if a "not acknowledged" signal is received for an earlier transmitted MSU, the not acknowledged MSU is retransmitted together with those MSUs which follow in order within the RTB at that time, if any.

Because MSUs usually each contain a small part of a larger block of information, e.g., a voice conversation, music, video, etc., it is important to retain the serial sequence of MSUs transmitted over the link. Thus if one MSU is not acknowledged, that MSU is retransmitted as well as all subsequent MSUs in the retransmit buffer.

Figure 4:
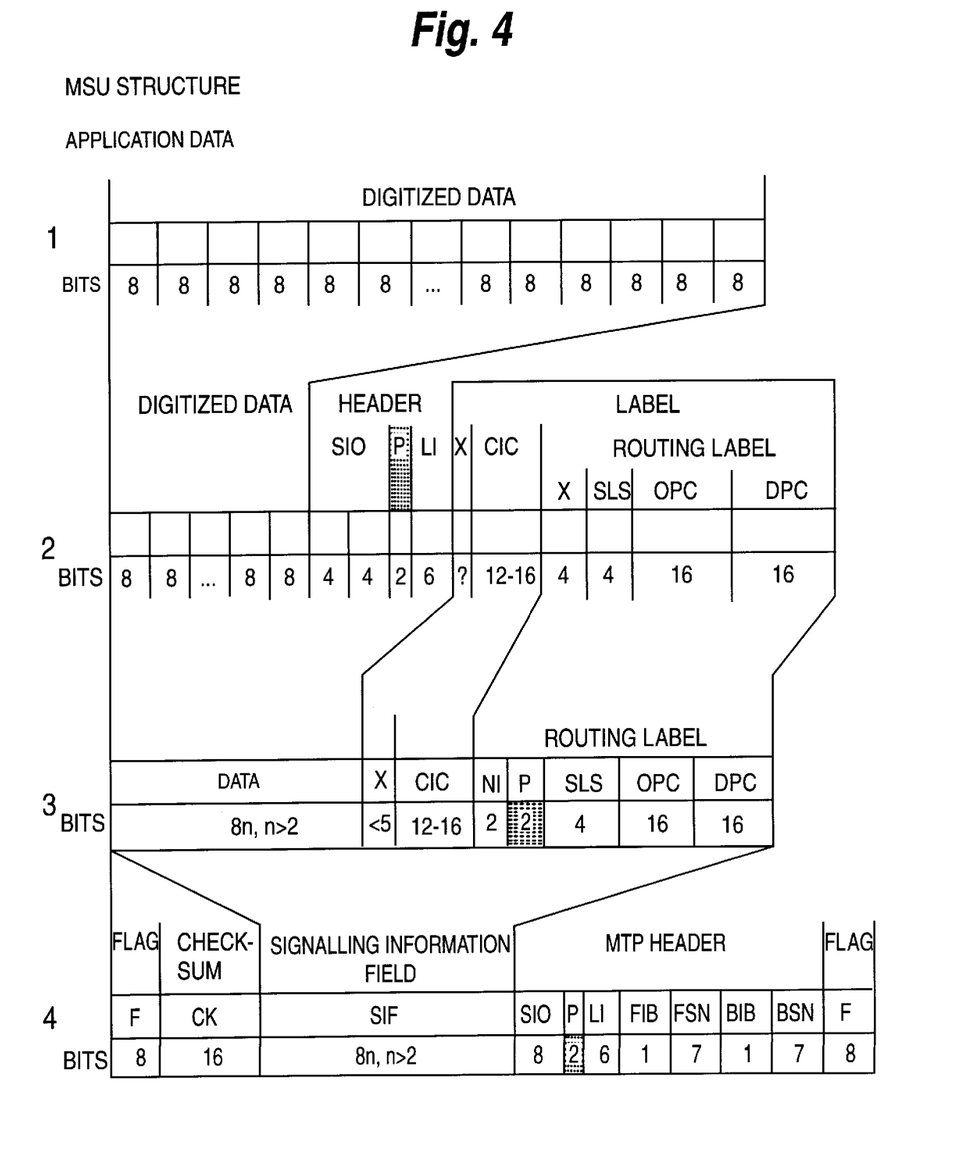
FIG. 4 illustrates an example messaging signal unit (MSU) data structure which may be used in the example embodiment of the present invention.

An example format of a signaling system 7 type message signaling unit is now described in conjunction with FIG. 4. Other message formats such as ATM formats, TCP/IP formats, etc. could be employed in other applications of the invention as will be appreciated by those skilled in the art.

When a user application desires to send data to another node, the application data is packaged into a packet or block and given a priority by the application or by the user part, e.g., ISUP or TUP etc., depending upon the specific application. For example, if there are four different message priorities, a two bit priority code may be used to encode each of the four priorities. Of course, fewer or greater numbers of priority bits may be used depending upon the desired number of priority levels.

In any event, the digitized application data is shown at line 1 as 8-bit octets. A label and a header including a priority (P) field are attached to the data field as shown at line 2. The label includes CIC, "X," SLS, OPC, and DPC fields. Each signaling point is uniquely defined with a binary code called the signaling point code (SPC). The code for a destination signaling point is called the destination point code (DPC). The DPC is used to route the message to the destination signaling point. The DPC is included as part of a routing label. To define the signaling point from which the message originates, an originating point code (OPC) is also included in the routing label. The routing label also includes a signaling link selection (SLS) field as well as four spare "X" bits. In the case of a TUP or an ISUP message, for example, the routing label also includes a circuit identity code (CIC) to indicate to which speech or data circuit the signaling message belongs.

The MSU header includes a service information octet (SIO) used by signaling functions to distribute the message to the appropriate user over a designated network as indicated in the SIO field. The message priority field in this example embodiment is a 2-bit field designating one of four message priorities. A length indicator (LI) field indicates the length of the message signal unit.

Line 3 shows the structure of the header which contains the SIO and the Length Indicator (LI), on arrival at the MPT-L3, which then adds the routing label, including the Network Indicator and the priority copied from the LI octet. The entire frame from line 3 at MTP-L2 becomes the signaling information field (SIF) of the MTP-L2 message as shown in line 4. At this point, the message transmission control software process 22 reads the MSU priority field from the routing label in the SIF and inserts that priority field into high bits of the LI octet just before inserting it into the correct transmit buffer having the same priority messages. If no priority is specified, the priority defaults to zero—the lowest priority.

A forward indicator bit (FIB), a forward sequence number (FSN), a backward indicator bit (BIB), backward sequence number (BSN), flags, and checksum bits are added to the MSU at the MTP-L1 interface frame driver process 26 to eliminate the need for MSU resequencing within the user parts. The FSN and FIB in one direction together and the BSN and BIB in the other direction are used for error correction, sequence control, and message acknowledgment. Sequence control is performed using the FSN while the acknowledgment is performed using the BSN. The FIB, FSN, BIB, and BSN are added just before a copy of the message is inserted into the retransmit buffer. The whole message is then given to the MTP-L1 Interface Frame Driver for computation of checksums and insertion of the framing bits "F" at both ends of the message. At this time, the message is given to MTP-L1 for physical transmission. The checksum bits are used to ensure correct transfer of MSUs over the signaling link without corrupting internal bit errors.

Figure 5:
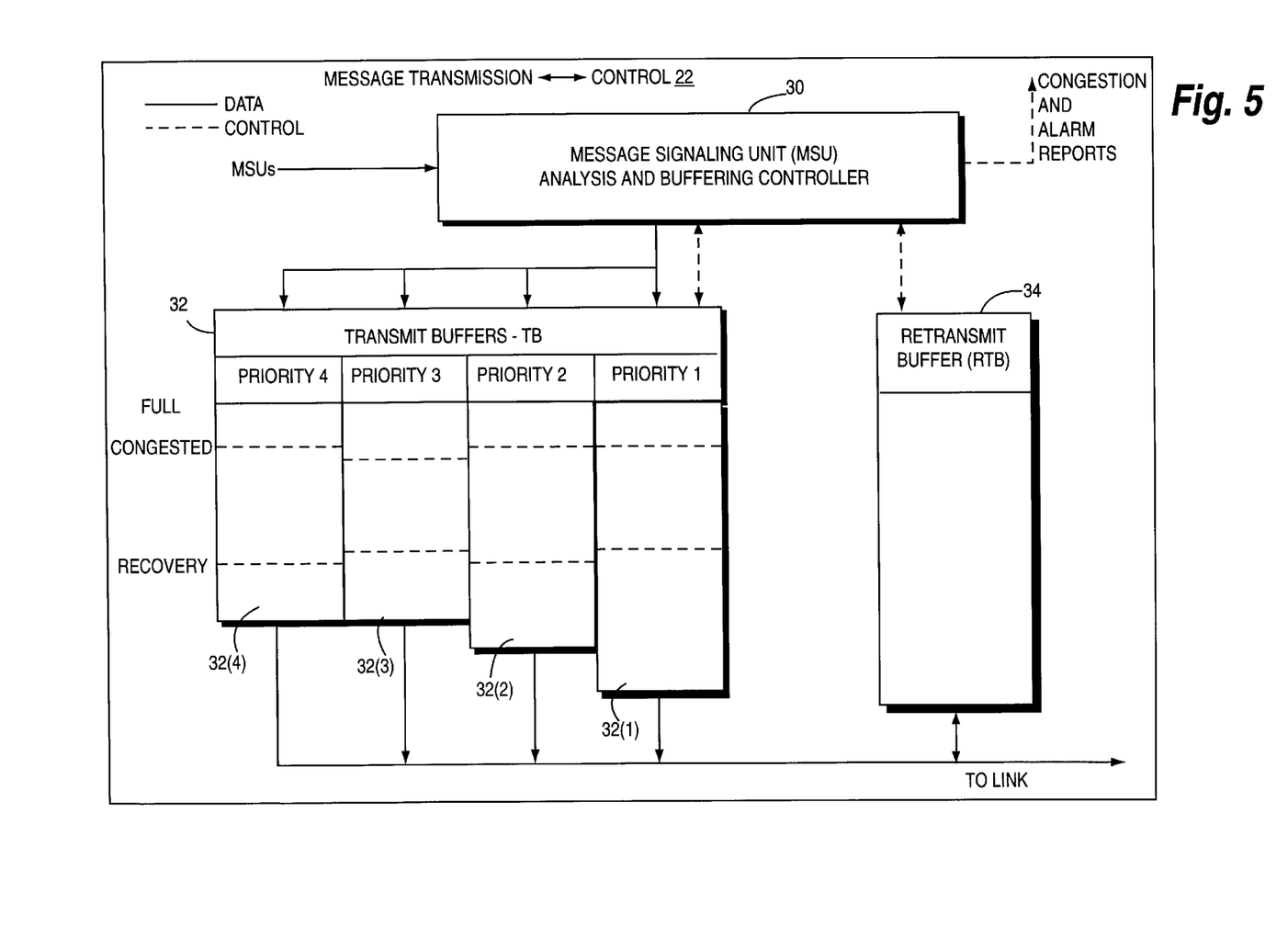
FIG. 5 is a more detailed block diagram illustrating the message transmission control block of FIG. 3.

FIG. 5 shows, in a functional block format, an example of congestion and priority message handling implemented in the message transmission control software process 22 at SS7 protocol level MTP-L2 in accordance with the present invention. The message transmission control process 22 includes a message signaling unit analysis and buffering controller 30 which may be implemented as a finite state machine. Controller 30 receives MSUs, formatted as described for example in conjunction with FIG. 4, (and among other things), determines the priority of each MSU by detecting the priority bits in the MTP header. Based on the determined priority, the controller 30 routes each MSU to a corresponding one of plural priority transmit buffers 32. In this example where messages can take on one of four different priorities, four different priority transmit buffers 32(1)–32(4) are illustrated. In the example embodiment, each transmit buffer is a first-in-first-out (FIFO) type buffer.

Messages are transmitted starting from the highest priority buffer continuing with the next highest priority buffer and so forth in the sequence with which the messages are stored in each of the buffers. In other words, all of the messages in the highest priority transmit buffer, e.g., priority buffer 1, are transmitted in the order in which they are received before messages in the next highest priority transmit buffer, i.e., priority buffer 2, are transmitted in the order in which they were received.

A significant advantage of the present invention is that each transmit buffer is configurable in terms of its size and various congestion levels. In addition to its size, each buffer is configured with three congestion levels: a congested level, a full level, and a recovery level. Consequently, different priority transmit buffers may be sized differently and have different congestion level parameters.

The present invention may be employed in non-congested situations to prioritize MSU transmissions over the link. In other words, the MSU analysis and buffer controller 30 "sorts" the MSUs for transmission by detected priority from each MSU header field using the priority transmit buffers. Consequently, higher priority MSUs are transmitted before lower priority MSUs. But the present invention is even more advantageous when congestion develops and there are more MSUs to transmit than can be transmitted over a specific time interval.

The following shows how a typical congestion scenario is managed using the present invention. Since the retransmit buffer 34 only holds a limited number of messages, a large number of message retransmissions may fill up the retransmit buffer 34. When the retransmit buffer is full or close to full, queued messages to be transmitted for the first time begin to back up. Those queued messages are therefore sorted by priority by the message signaling unit analysis and buffer controller 30 and saved in arrival order in the priority transmit buffers 32(1)–32(4). When the number of messages stored in the retransmit buffer 34 or one of the priority transmit buffers 32 reaches its configured congestion level, the MSU analysis and buffering controller 30 sends a congestion report to a higher SS7 protocol level, i.e., MTP-L3 and up, so that those higher SS7 levels stop sending additional messages. The configured congestion level is set to less than the configured full level to permit messages which are already in the "pipeline," i.e., already forwarded from the upper SS7 levels for transmission when the congestion report was generated, to be stored in the buffer space between the congested and full levels. If messages for a particular priority buffer are received after that buffer is full, those additional messages are discarded upon arrival, and an alarm is sent from the MSU analysis and buffering controller 30 to higher levels in the SS7 stack, so that the operator may take remedial action by reconfiguring and "tuning" the buffers so that messages are no longer lost.

As messages are successfully transmitted, i.e., acknowledged, additional room is made in one or more of the transmit buffers and in the retransmit buffer. When the number of accumulated messages is reduced to at or below the recovery level, the MSU analysis and buffering controller 30 sends a resume message to the upper protocol levels so that new messages are sent for transmission over the link.

Figure 6:
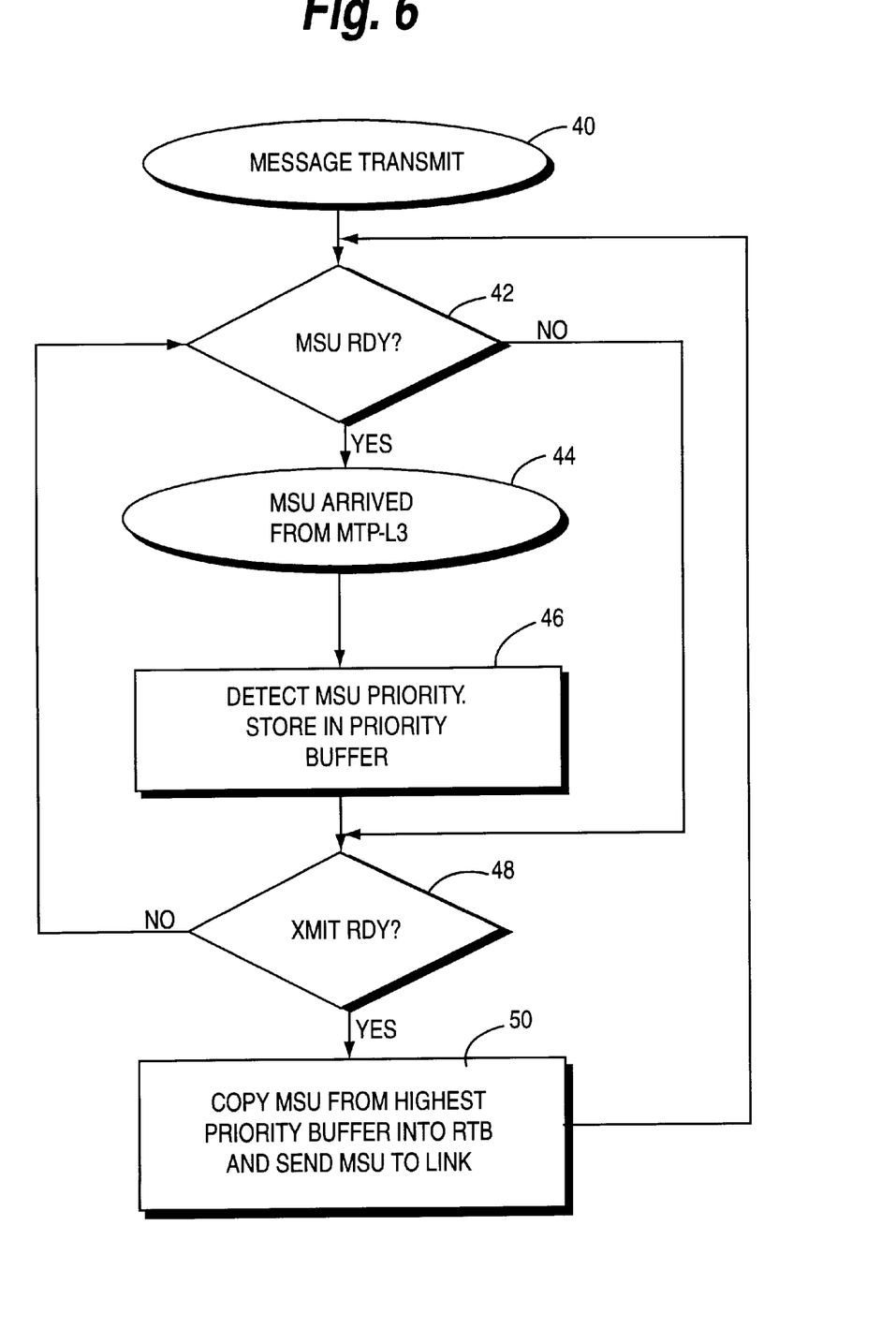
FIG. 6 is a flowchart diagram of a message transmit routine in accordance with an example embodiment of the present invention.

FIG. 6 illustrates a transmit message routine describing an example method of implementing the present invention. A decision is made in block 42 whether a message signaling unit has arrived in the MTC process 22 in FIG. 3. If so, an MSU has arrived from MTP-L3 (block 44), and the MSU analysis and buffering controller 30 detects the priority of that received MSU. Based on the detected priority, the controller 30 stores that MSU in its corresponding priority transmit buffer 32. From the number of messages accumulated in the retransmit buffer 34 still awaiting acknowledgment, a decision is made whether an MSU can be transmitted from one of the priority transmit buffers (block 48). If the number of MSUs awaiting to be retransmitted in the retransmit buffer 34 exceeds its configured filled level, "new" MSUs are not transmitted from the priority transmit buffers. However, if the number of accumulated messages in the retransmit buffer does not state level or is at or below the recovery level (assuming a previously congested state), the next MSU from the highest priority transmit buffer is transmitted over the link and copied into the retransmit buffer 34.

An example buffer monitor routine 60 is now described in conjunction with the flowchart illustrated in FIG. 7. The re-transmit buffer may be dimensioned in relation to the number of bits in the Forward Sequence Number (FSN) field, most commonly seven bits, so that there are 128 possible values indexed in the re-transmit buffer 34 by the FSN field. Each of the priority transmit buffers 32 may be independently configured in terms of size and congestion level parameters (block 62). This configurability advantageously allows a priority buffering scheme to be tailored to the needs of a specific application. A decision is made at block 66 whether one or more of the priority transmit buffers 32 has reached its configured congestion level. If so, the MSU analysis and buffering controller 30 transmits a congestion message to MTP-L3 via the linked reception control software process 24, the upper layer transmission interface 18, and the MTP-L3 bus driver 12 to halt transmission of messages of this priority (block 66). Those messages already transmitted in the pipeline from upper signaling levels before the congestion message was transmitted are buffered in the corresponding priority buffer in the space allocated between the congested and full levels. A decision is made in block 70 whether any one of the buffers is full. If so, the message signaling unit analysis and buffering controller 30 sends an alarm report up to the upper layers and any further received messages at that full buffer are discarded (block 72). A decision is made in block 74 whether a buffer's accumulated message level is reduced to one less than its configured recovery level. If so, a RESUME message is transmitted from the analysis buffering controller to the upper protocol stack layers indicating that additional messages of this priority can be buffered and transmitted.

The following is one example implementation of the FIFO buffered in memory where messages are written and retrieved from memory using appropriate pointers. MSUs occupy areas of memory indicated by pointer values giving the address of the first octet in the message. Thus, a message may be "stored" in a FIFO buffer by storing the value of this pointer in the proper transmit buffer. When the message is to be transmitted, the relevant values of the FIB, FSN, BIB, and BSN are inserted into the respective fields of the MTP Header, and the pointer is inserted into the next higher, unoccupied position of the retransmit buffer (RTB) which is indicated by the FSN value. This pointer value is also passed as an address parameter to the MTP-L1 Interface Frame Driver process which reads the MSU contents. The CRC value is then put into the two octets following the end of the SIF field, and the message is transmitted on the link.

Since the FIFO buffers are implemented as simple arrays of pointers, indexed by paired integer counters modulo the dimension of the dimension of the transmit buffer in question, no linking is needed. The first integer counter indicates the index of the first MSU in each FIFO buffer, and the other counter indicates the index of the last MSU. The absolute difference between the two counters may be used to compute the number of MSUs in the buffer. The number of MSUs in the buffer may then be compared to the configured filled, congestion and recovery buffer levels.

Likewise, the retransmit buffer is a fixed array of pointer values indexed by the FSN value. A pair of integer indexes to the first and last occupied FSN positions in the retransmit buffer array are maintained in order to compute the number of MSUs in the retransmit buffer. This permits rapid deletion of messages by stepping the first-MSU counter to the acknowledged FSN value, while returning the MSU memory areas to the operating system.

Thus, there are no linked lists, no links, and no dynamic memory areas in the buffer implementations; only simple indexed arrays of pointer values. Further, the number of priority transmit buffers can be implemented as desired depending upon the number of bits available in the MSU formats. The transmit buffer dimension, the congestion level, and the release level may therefore be specified in an efficient manner by the use of a single integer value per transmit buffer. Finally, the use of individual transmit buffers for each priority value accomplishes a separation of the MSUs for easy transmission in priority order while retaining the required transmission sequencing at minimal cost. This simplicity permits efficient coding which allows less overhead and thus higher throughput of MSUs. Likewise, this simplicity reduces the frequency of coding errors, allows easy maintenance, and improved performance.

The foregoing description shows only one preferred, example embodiment of the present invention. Various modifications are apparent to those skilled in the art without departing from the scope of the present invention defined only by the appended claims. Therefore, the embodiment shown and described is only illustrative, not restrictive.

What is claimed is:

1. A method for managing the transmission of messages, comprising the steps of:
    establishing one or more buffers corresponding to different message priorities;
    establishing for each buffer a congestion level, a full level, and a recovery level;
    processing a plurality of messages to be transmitted to determine the priority of each message;
    storing each of the messages in the buffer corresponding to the priority determined for each message;
    transmitting messages from the buffer having a highest priority following by transmitting messages from another buffer having a next highest priority,
    wherein when an accumulated number of messages in one of the buffers exceeds its established congestion level, a congestion message is generated requesting that no new messages of a corresponding or lower priority be presented for transmission over the link, the method further comprising:
        determining if a number of messages in one of the buffers exceeds the full level, and if so, preventing storage of further messages in the one buffer;
        generating a resume message when the accumulated number of messages in the buffer reaches or is less than the recovery level; and
        thereafter, accepting new messages having the corresponding priority at the buffer.

2. The method in claim 1, further comprising:
    assigning a priority to each of a plurality of messages.

3. The method in claim 1, further comprising:
    for each buffer, establishing a configurable size of the buffer.

4. The method in claim 1,
    wherein the congestion level, the full level, and the recovery level for each buffer are configurable.

5. The method in claim 1, further comprising:
    storing messages in a corresponding priority buffer presented after the congestion message is generated in a storage area between the buffer's congestion and full levels.

6. The method in claim 1 as applied to a common channel signaling system, wherein the common channel signaling system corresponds to Signaling System Number 7.

7. The method in claim 6, wherein the steps in claim 1 are implemented at a message transfer part layer two in the Signaling System Number 7 or similar signaling protocol.

8. The method in claim 1 as applied to a multi-layered data communications protocol, wherein the steps in claim 1 are implemented at any one of the communications protocol layers from a lowest transmission layer up through a highest application layer.

9. The method in claim 1, wherein the transmitting step includes copying the message being transmitted into a retransmit buffer, and wherein the method further comprises:
    detecting whether each transmitted message has been successfully transmitted;
    if not, retrieving the unsuccessfully transmitted message from the retransmit buffer and retransmitting the unsuccessfully transmitted message; and
    if so, removing the transmitted message from the retransmit buffer.

10. In a data communications system where messages are transmitted from a first data communications point to a second data communications point in accordance with a multi-level signaling protocol, a method for managing message congestion and prioritizing message transmission at one of the signaling protocol at the first data communications point, comprising the steps of:
    assigning a priority to the messages at a signaling protocol level higher than the one signaling protocol level;
    configuring one or more buffers having corresponding message priorities;
    establishing for each of the one or more buffers a congestion level, a full level, and a recovery level;
    processing the messages to determine the priority assigned to each message;
    monitoring congestion levels of the one or more buffers;
    storing the messages in the buffer corresponding to the determined priority for each message; and
    transmitting messages from a highest priority buffer followed by transmitting messages from a next higher priority buffer,
    wherein when an accumulated number of messages in one of the buffers exceeds the established congestion level, a congestion message requesting that no new messages of a corresponding or lower priority is presented for transmission over the link, and if the accumulated number of messages exceeds the full level, storage of further messages in the one buffer is prevented, the method further comprising generating a resume message when the accumulated number of messages in the buffer reaches or is less than the recovery level, and thereafter accepting new messages having the corresponding or higher priority at the buffer.

11. The method in claim 10, wherein one of the buffers is a retransmit buffer, the method further comprising:
    storing each transmitted message in the retransmit buffer;
    deleting the message and preceding unacknowledged messages from the retransmit buffer when the message is acknowledged; and
    retransmitting the message and all following messages from the retransmit buffer when the message is not acknowledged.

12. The method in claim 10, wherein the common channel signaling corresponds to Signaling System Number 7, and wherein the one level is a message transfer part (MTP) level two.

13. The method in claim 10, further comprising:
    inserting into each message one or more priority fields indicating the assigned priority.

14. The method in claim 11, further comprising:
    for each of the one ore more buffers, establishing a size of the one or more buffers.

15. The method in claim 10, further comprising:
    storing messages in a corresponding priority buffer presented after the congestion message is generated.

16. A system for managing messages at a first signaling point and prioritizing the transmission of messages from the first signaling point to a second signaling, comprising:
    a plurality of buffers some of which correspond to different priorities;
    a message controller processing messages to be transmitted to the first signaling point, determining the priority of each message, and selectively storing each message in one of the buffers corresponding to the determined priority of each message; and a transmitter transmitting messages from one of the buffers having a highest priority followed by transmitting messages from another of the buffers having a next highest priority, wherein each buffer includes a congestion level such that when an accumulated number of messages in one of the buffers exceeds the established congestion level, the message controller generates a congestion message requesting that no new messages of this or lower priority be presented for transmission, wherein each buffer includes a full level, and the message controller determines if a number of messages in one of the buffers exceeds the full level, and if so, prevents storage of further messages in the one buffer, and wherein each buffer includes a recovery level, and wherein the message controller determines when the accumulated number of messages in one of the buffers reaches or is less than the recovery level, generates a resume message, and thereafter stores in the one buffer new messages for transmission having a priority corresponding to the one buffer priority.

17. The system in claim 16, further comprising:

a retransmit buffer storing each transmitted message, wherein the message controller detects whether each transmitted message has been successfully transmitted, and if not, retrieves the unsuccessfully transmitted message from the retransmit buffer and retransmits the unsuccessfully transmitted message, and if so, removes the transmitted message from the retransmit buffer.

* * * * *